Figure 4:
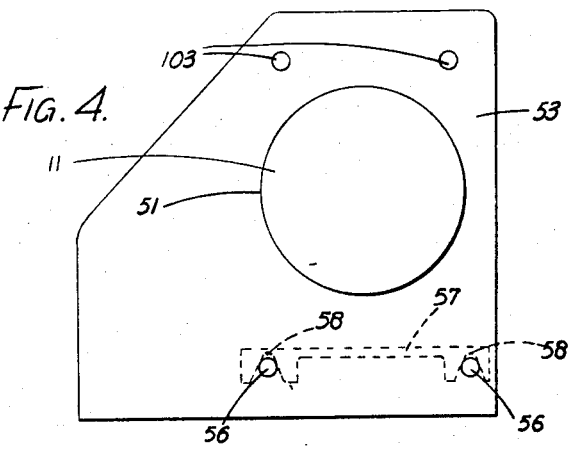

Dec. 22, 1953   H. H. HOPKINS   2,663,223
VARIABLE MAGNIFICATION OPTICAL SYSTEM
Filed July 13, 1951   3 Sheets-Sheet 1
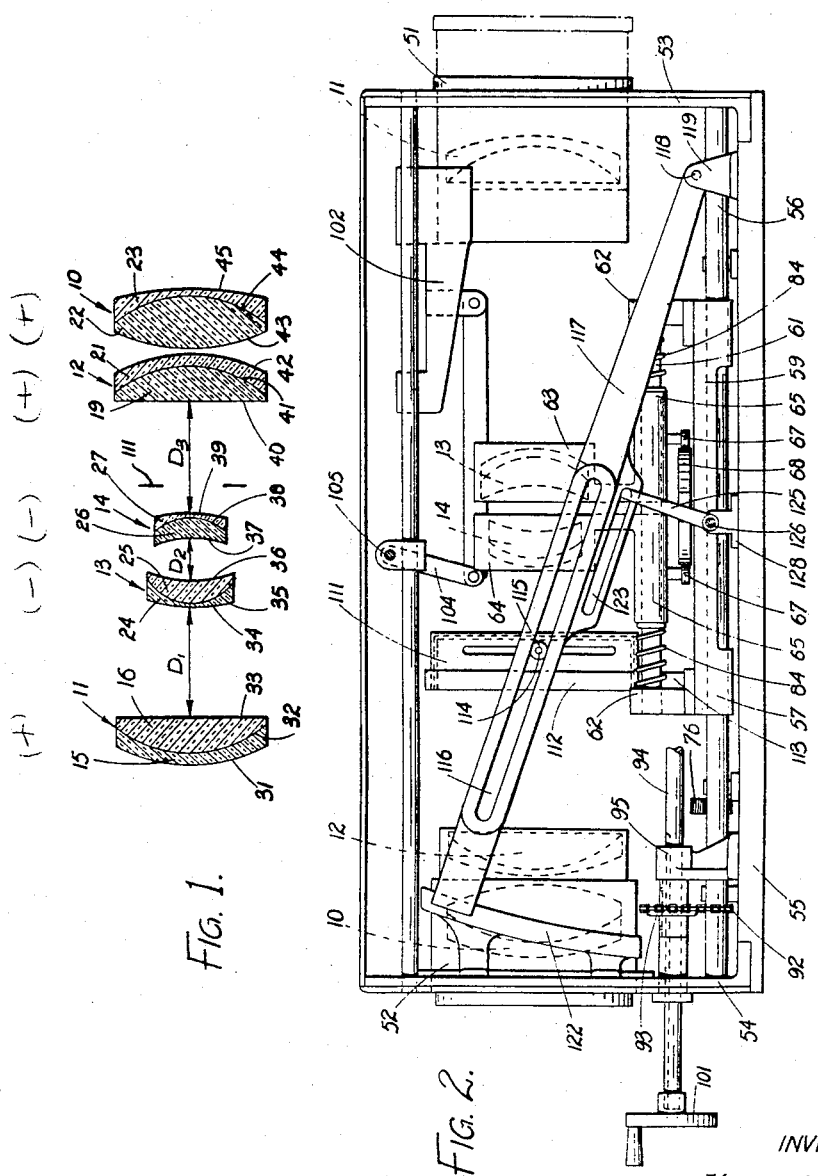
INVENTOR:
H. H. Hopkins
BY:
Watson, Cole, Grindle & Watson
ATTORNEY:

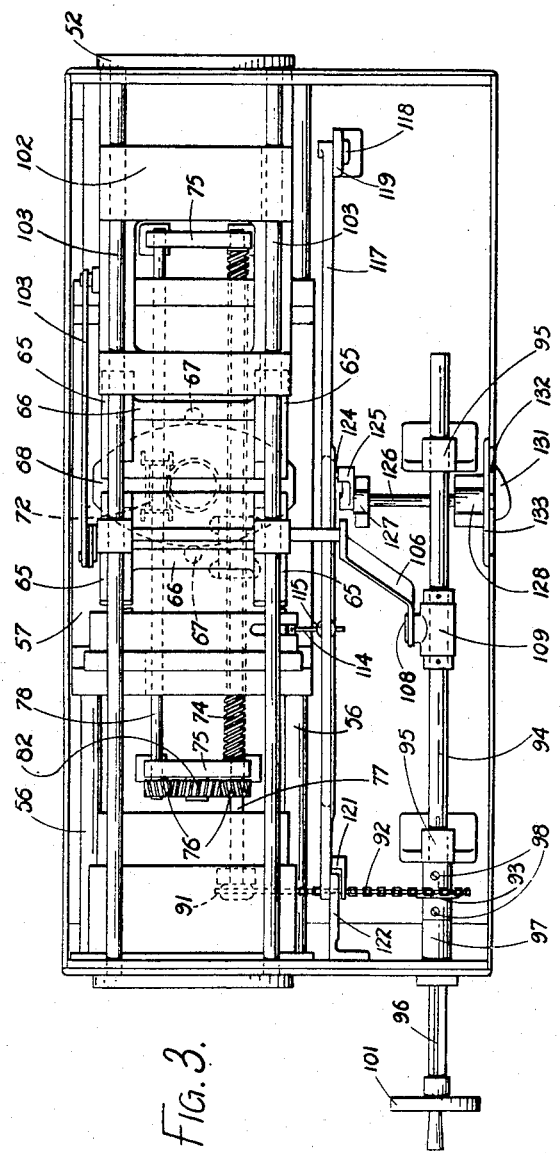

Dec. 22, 1953  H. H. HOPKINS  2,663,223
VARIABLE MAGNIFICATION OPTICAL SYSTEM
Filed July 13, 1951

INVENTOR:
H. H. Hopkins
BY:
Watson, Cole, Grindle & Watson
ATTORNEY:

Patented Dec. 22, 1953

2,663,223

UNITED STATES PATENT OFFICE 2,663,223

VARIABLE MAGNIFICATION OPTICAL SYSTEM

Harold Horace Hopkins, London, England, assignor to W. Watson & Sons, Limited, London, England, a British company Application July 13, 1951, Serial No. 236,482

Claims priority, application Great Britain July 18, 1950

8 Claims. (Cl. 88—57)

The invention relates to variable magnification optical systems and is more particularly concerned with optical systems of the kind (hereinafter referred to as the kind described) for producing an image of continuously variable size of an object at a fixed distance from the system and comprising two normally stationary lenses, having powers of like sign (i. e. both positive or both negative), and two axially movable lenses, having powers of like sign which is opposite to the sign of the powers of the normally stationary lenses, all of which lenses are arranged on a common optical axis with the movable lenses between and spaced from the two normally stationary lenses, and magnification varying means for continuously and simultaneously differentially moving the movable lenses in the axial direction of the system by amounts such that the distance from the normally stationary lenses at which the image of an object at a fixed distance from the normally stationary lenses is accurately focussed remains constant, while the size of the said image is continuously varied during the operation of the adjusting means.

The term "normally stationary lens" is to be understood to mean a lens which remains stationary during the continuous variation of the size of an image of an object at a fixed distance from the system.

Examples of optical systems of the kind described are described and claimed in British patent specifications Nos. 639,610, 639,611, 639,612 and 646,409, and in U. S. patent specifications Nos. 2,501,219, dated March 21, 1950, 2,537,561, dated January 9, 1951, 2,514,239, dated July 4, 1950, and Serial No. 55,965 now Patent No. 2,566,889, dated September 4, 1951.

The invention is more especially, but not exclusively, concerned with systems of the kind described in which the normally stationary lenses are positive and the movable lenses are negative (i. e. as described in British specification No. 646,409 and U. S. specification No. 2,514,239).

In systems of the kind to which the invention relates, one or both of the two normally stationary lenses may be mounted for adjusting movement along the optical axis and focus-adjustment means may be provided and may be operable, independently of the magnification-varying means, to move the or each adjustably mounted stationary lens to effect focussing of the system, as described and claimed in British patent specification No. 639,611. It will be appreciated that although the operation of the focus-adjustment means is described in that specification with special relation to initial focussing of the system on to a fixed object before operation of the magnification-varying means, the focus-adjustment means specifically described in that specification may equally well be adjusted during operation of the magnification-varying means without alteration to the structure specifically described in that specification. Thus the magnification of the system described in that specification may also be varied while the focussing of the system is adjusted independently to keep in focus an object which moves during the variation of magnification.

Further, in such systems each of the four lenses may be a compound lens comprising two or more component lenses in contact or spaced apart by a fixed distance or fixed distances, one or more of which component lenses may comprise two or more lens elements in contact.

It is an object of the present invention to provide an improved optical system of the kind described, in which the aberrations are reduced and which has a greater range of variation of magnification.

The primary aberrations which may occur in systems of the kind described are of seven main types usually denoted by symbols, viz: $S_1$—spherical aberration, $S_2$—coma, $S_3$—astigmatism, $S_4$—field curvature, $S_5$—distortion, L—axial chromatic aberration, and T—chromatic variation of magnification.

It is well known that when the chromatic aberrations L and T of a lens system are corrected for one position of the object and stop, they will also be corrected in all positions of the object and stop. Consequently the system may be substantially corrected for chromatic aberrations by employing achromatic lenses and/or achromatic component lenses throughout the system. It then follows that the system will have substantially no chromatic aberrations no matter how the relative positions of the movable lenses vary during the variation of the image size.

Further it is well known that the field curvature $S_4$ of a lens system is determined by the construction of the individual lenses and is quite independent of the positions of the object and the stop. Consequently the system may be made substantially free of field curvature for all positions of the movable lenses by so arranging the construction of the system that it is free from field curvature for any one position of the movable lenses.

It is well known, and can be easily proved in optical theory, that the astigmatism $S_3$ of any simple or compound lens is a constant when the stop is in contact with the lens, and is independent of the object distance and the precise construction of the simple or compound lens itself. The astigmatism does in general vary with change in the position of the stop, but in the special case when the spherical aberration $S_1$ and coma $S_2$ are zero the astigmatism does not vary with the position of the stop.

From the above considerations it would appear that if each of the four lenses in an optical system of the kind described were to be a compound lens individually corrected for chromatic aberrations and individually aplanatic (that is, free from spherical aberration and coma) then the astigmatism of the whole system would remain constant and independent of any variation in the position of the stop and of the separations between the four lenses. However, it has been found that this is not so and that if a system is constructed in that manner, the coma of the two movable lenses changes as the image size varies, since the position of the effective stop for each of the movable lenses changes as the movable lenses are moved to vary the image size. Further, it has been proved that in any lens consisting of component lenses in contact with each other, the coma of the lens can be corrected for only one position of the object. It is thus impossible to obtain a variable magnification system free from coma and astigmatism by arranging that each lens is individually aplanatic, because any lens for which the object position changes will be aplanatic for only one position of the object.

The invention provides a variable magnification optical system of the kind described, in which the movable lenses are compound, are optically identical except, it may be, in respect of their apertures, are arranged with their refracting surfaces symmetrically positioned about a point on the axis midway between the movable lenses and are substantially corrected for coma and spherical aberration at one limit of the range of movement of the movable lenses, whereby the change in coma and of spherical aberration of each movable lens during variation of the magnification is substantially compensated continuously by a change of coma and spherical aberration of the same magnitude, but of opposite sign, in the other movable lens.

The movable lenses preferably have ranges of movement such that the joint magnification of the two movable lenses varies from a maximum numerical value of $\sqrt{R}$ to a minimum numerical value of $$\frac{1}{\sqrt{R}}$$

where R is the ratio of the maximum value to the minimum value of the magnification of the system as a whole. The system is then such that when it is adjusted for maximum magnification the optical conditions produced by the two movable lenses are identical but reversed in relation to those prevailing when the system is adjusted for minimum magnification. This follows from the fact that the ray paths from and to the object and image planes may be traversed in either direction, and that the magnifications in the two extreme conditions of the system are reciprocals one of the other. The positions of the two movable lenses when their magnifications are minus $\sqrt{R}$ and minus $$\frac{1}{\sqrt{R}}$$

respectively will be referred to as their extreme positions.

In the arrangement provided by the invention the change in coma of each of the movable lenses during variation of the magnification of the system is compensated continuously by a change in coma of the same magnitude, but of opposite sign, in the other movable lens. This is achieved by constructing the system so that it is corrected for spherical aberration and coma when the movable lenses are in either of their extreme positions. It follows, from considerations of symmetry, that the system will then also be corrected for spherical aberration and coma when the movable lenses are in the other extreme position, if the mechanical limitations of the system permit them to assume that other extreme position.

As the magnification of the system, and consequently of the two movable lenses, varies continuously, it follows that the two movable lenses must pass through a position (referred to as their mean position) in which their magnification is minus 1, since minus $\sqrt{R}$ is the reciprocal of minus $$\frac{1}{\sqrt{R}}$$

No matter what symmetrical arrangement is employed it follows from considerations of symmetry that the system will be free from coma when the movable lenses are in their mean position. It can be shown in optical theory that since the coma of the system is corrected for three positions of the movable lenses the coma of the system will therefore also be substantially corrected for all other positions of the movable lenses between their above-mentioned extreme positions.

The spherical aberration also remains very small even when quite large apertures are employed. The spherical aberration is zero, as above described, when the movable lenses are in their extreme positions and, further, it can be shown that its magnitude is stationary when the movable lenses are in their mean position. It follows from a generalisation of Herschel's condition that, for systems of low aperture, the change in spherical aberration is small when the well-known so-called "sine condition" is satisfied. The sine condition amounts simply to the condition that there shall be no coma, so that condition is substantially satisfied when the movable lenses are in their extreme positions, and it follows that the change of spherical aberration with magnification is small under those conditions. In practice it is found that the relative apertures of the movable lenses may be as large as F/5 for a system giving a 5:1 range of magnification, without undue spherical aberration. The spherical aberration is zero when the movable lenses are in their extreme positions and changes only slowly when the movable lenses are between their extreme positions, since the sine condition is satisfied throughout the range of magnification.

The system is preferably designed so that the distortion is as small as possible when the movable lenses are at one of their extreme positions. It follows from symmetry that the distortion will be of the same magnitude but of opposite sign when the movable lenses are at their other extreme position. It also follows from symmetry that distortion will be zero when the movable lenses are in their mean position. It can be shown that the distortion when the movable lenses are at any other position in their range of movements is less than the distortion when they are at their extreme positions.

It is found that by constructing the component lens of glasses having appropriate properties it is possible to ensure that the astigmatism of the system is small. The astigmatism is the same when the movable lenses are in their two alternative extreme positions.

The two normally stationary lenses may be optically identical, except, it may be, in respect of their apertures and may have their refracting surfaces symmetrically positioned about a point on the optical axis midway between them. Alternatively the system may be such that if the fourth lens (i. e. the rear normally stationary lens) were to be identical and symmetrical with the first lens (i. e. the front normally stationary lens) the system would be substantially corrected for astigmatism, field-curvature, distortion, axial chromatic aberration and chromatic variation of magnification, at one limit position in the range of movement of the movable lenses, but in which the said fourth lens, while maintaining the correction of the aberrations, is not identical with the said first lens.

In a preferred form of the invention the movable lenses are of meniscus form and each comprise at least one positive component lens and at least one negative component lens, the said positive component of each movable lens being the nearest component of that lens to the other movable lens, and the normally stationary lens which is arranged to be nearer to the object when the system is in use (i. e. the front normally stationary lens) is a compound lens of the so-called "flint-leading" construction.

A system according to the invention may be employed alone or, for example, in conjunction with a separate camera objective lens of fixed focal length. Alternatively the system may be embodied in a camera objective lens.

In one form of the invention the aforesaid four lenses, forming a variable magnification telescopic system are employed in conjunction with one or more additional lenses e. g. situated between the said telescopic system and the image position to provide a system having a variable finite focal length. An advantage of this form, as opposed to constructing the variable magnification system as an attachment for any standard lens, is that the aberrations of the four-lens system need only remain constant (and not necessarily zero) during variation of the magnification, as the residual aberrations of the four-lens system may be corrected by suitable design of the additional lens or lenses. The additional lens or lenses may then be of simpler construction than fully corrected lenses. Further, the aperture stop may be placed within the four-lens variable magnification system and may be arranged to move with the movable lenses. In that case the diameter of the aperture must be varied when the movable lenses are moved, in order to keep the relative aperture constant during variation of the magnification. Mechanical advantages arise from that arrangement owing to the smaller diameters of the lenses which can be employed, and optical advantages are obtained owing to the smaller incidence heights of oblique pencils at the different surfaces.

Figure 5:
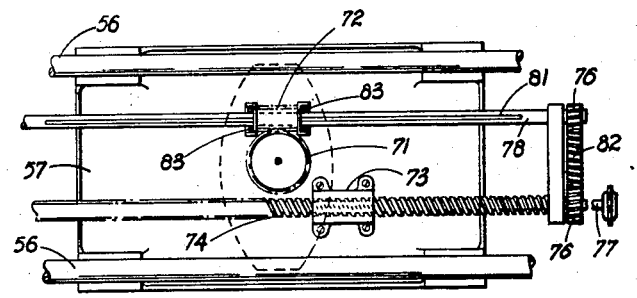
Figure 6:
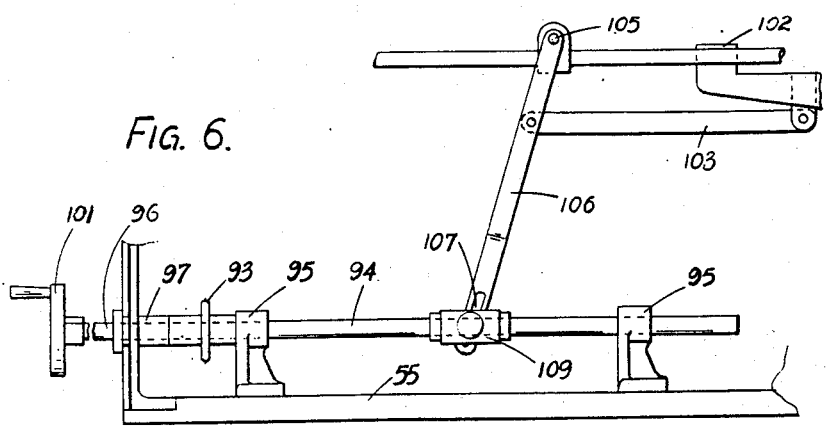

A specific construction of a camera objective lens embodying a system according to the invention will now be described by way of example and with reference to the accompanying drawings in which:

Figure 1 is a diagrammatic longitudinal section through the objective showing the arrangement of the lenses, Figure 2 is a side view of the objective with part of the cover removed and with part of the focussing control system omitted for the sake of clarity, Figure 3 is a plan view of the objective with part of the cover removed, Figure 4 is a front view of the objective, Figure 5 is a detail view showing the underside of the carrier, and Figure 6 is a detail view showing the focussing control system.

The objective comprises three normally stationary positive compound achromatic lenses 10, 11, 12, and two movable negative compound achromatic lenses 13, 14. The lens 11 comprises two component lenses 15, 16 in contact and having optical surfaces 31, 32, 33. The lens 12 comprises two component lenses 19, 21 in contact and having optical surfaces 40, 41, 42. The lens 10 comprises two component lenses 22, 23 in contact and having optical surfaces 43, 44, 45. The axial separation between the surfaces 42 and 43 is 2.50 mm.

The lens 13 comprises two component lenses 24, 25 in contact and having optical surfaces 34, 35, 36. The lens 14 comprises two component lenses 26, 27 in contact and having optical surfaces 37, 38, 39.

The various lens elements and component lenses are made of the following glasses and have the following axial thicknesses:

| Component | Glass | Axial thickness, mm. |
|---|---|---|
| 15 | D. F. | 7.85 |
| 16 | M. B. C. | 28.0 |
| 24 | M. B. C. | 5.14 |
| 25 | B. F. | 14.19 |
| 26 | B. F. | 14.19 |
| 27 | M. B. C. | 5.14 |
| 19 | M. B. C. | 28.0 |
| 21 | D. F. | 7.85 |
| 22 | H. C. | 34.5 |
| 23 | E. D. F. | 7.37 |

The details of the glasses are as follows:

D. F.—Dense Flint:
 $N_D = 1.623$
 $V = 36.0$

M. B. C.—Medium Barium Crown:
 $N_D = 1.572$
 $V = 57.7$

B. F.—Barium Flint:
 $N_D = 1.623$
 $V = 39.6$

H. C.—Hard Crown:
 $N_D = 1.517$
 $V = 60.6$

E. D. F.—Extra Dense Flint:
 $N_D = 1.700$
 $V = 30.3$ ($N_D$ is the refractive index for the D-line.)
(V is the reciprocal of the dispersive power.)

The optical surfaces have the following radii:

| Surface | Radius, mm. | Surface | Radius, mm. |
|---|---|---|---|
| 31 | +182.7 | 39 | −357.0 |
| 32 | +80.29 | 40 | infinity |
| 33 | infinity | 41 | −80.29 |
| 34 | +357.0 | 42 | −182.7 |
| 35 | +40.64 | 43 | +142.1 |
| 36 | +77.84 | 44 | −99.4 |
| 37 | −77.84 | 45 | −261.2 |
| 38 | −40.64 | | |

The above surface radii are stated as (+) when the surface is convex to the incident light when the system is in normal use, and as (—) when the surface is concave to the incident light when the system is in normal use.

It will be appreciated that the lenses 13 and 14 are identical with one another with respect to the radii of their optical surfaces, their glasses and the thicknesses of their components, and are therefore optically identical (except for their diameters) and are arranged so that their refracting surfaces are symmetrically positioned about a point on the axis midway between the lenses 13 and 14.

The lenses have the following diameters:

| Lens | Diameter, mm. |
| --- | --- |
| 11 | 117.00 |
| 13 | 71.50 |
| 14 | 58.50 |
| 12 | 117.00 |
| 10 | 117.00 |

The axial separations between the lenses 11, 13, 14 and 12 are indicated in Figure 1 as $D_1$, $D_2$ and $D_3$ and the necessary law of movement gives values of those separations (in mm.) as follows, when the system is focussed on to an object at infinity:

| $D_1$ | $D_2$ | $D_3$ | Relative Magnification |
| --- | --- | --- | --- |
| 160.66 | 88.42 | 3.87 | 2.27 |
| 156.75 | 70.64 | 25.56 | 1.98 |
| 147.33 | 47.78 | 57.84 | 1.59 |
| 136.28 | 35.08 | 81.59 | 1.32 |
| 125.45 | 29.37 | 98.14 | 1.15 |
| 112.75 | 27.46 | 112.75 | 1.00 |
| 98.14 | 29.37 | 125.45 | 0.87 |
| 81.59 | 35.08 | 136.28 | 0.75 |
| 57.84 | 47.78 | 147.33 | 0.63 |
| 25.56 | 70.64 | 156.75 | 0.56 |
| 3.87 | 88.42 | 160.66 | 0.44 |

In this example a numerical magnification of 2.27 corresponds to a focal length of approximately 510 mm. for the system, a numerical magnification of 1.0 corresponds to a focal length of approximately 230 mm. and a numerical magnification of 0.44 corresponds to a focal length of approximately 100 mm.

The lens 11 may be adjusted axially away from the lens 13 in order to focus the system onto an object at a distance less than can be considered at infinity. The law of movement of the movable lenses 13, 14 remains the same, a constant amount being in that case added to each of the values of $D_1$ given in the above table.

The four lenses 11, 13, 14, 12, form a variable magnification telescopic system. The lens 10 converts it to a system having a focal length which is variable between 20" and 4". Over this wide range mechanical considerations make it necessary to employ a relative aperture for the complete system not greater than F/6.3. When smaller ranges of focal lengths are employed the maximum relative apertures for the complete system are as follows:

F/3 for the range 4"–9½"
F/4 for the range 4"–12½"
F/5 for the range 4"–16"

The relative apertures of the movable lenses do not exceed F/5.

The lens 10 is designed to correct the residual aberrations of the lenses 11, 13, 14, 12 and it is merely a cemented doublet lens. The system of this example is far simpler than an equivalent system in which a four-lens variable magnification system is corrected individually and employed with an individually corrected camera objective.

The two lenses 11 and 12 are carried in cells 51, 52 mounted in end plates 53, 54 at the ends of the top face of a rectangular base plate 55 which extends horizontally forward from the front of the camera. Two straight rods or tubes 56 extend along the top face of the base plate 55 along the length thereof from one end plate to the other, parallel to the sides of the base plate. A carrier 57, comprising a smaller rectangular plate 59, has longitudinal grooves 58 in one of its faces and those grooves 58 rest over the rods 56 so that the carrier 57 is slidable along them. The carrier 57 has above and spaced from its upper face two rods or tubes 61 extending longitudinally from one end of the carrier 57 to the other near and parallel to the sides of the carrier, the rods 61 being secured to brackets 62 on the carrier. The lenses 13 and 14 are mounted in cells 63, 64 attached to sleeves 65 which slide along the rods 61. The two sleeves 65 are connected in pairs by members 66 which each carry a small roller 67 rotatable about a vertical axis. The two rollers 67 co-operate with diametrically opposite positions on the periphery of a cam 68 which is carried on a short vertical shaft extending through the carrier plate 59 and carrying, at the lower face of the carrier plate, a gear wheel 71 which is in engagement with a worm 72.

The lower face of the carrier has securely attached to it a nut 73 in engagement with a lead screw 74 which is journalled in brackets 75 secured to the base plate 55 and may be rotated so as to move the carrier 57 along the base-plate 55. The lead-screw 74 is connected through an extension shaft 77, gears 76 and an idler gear 82 to a shaft 78 running parallel to the lead-screw and also journalled in the brackets 75. The worm 72 is slidable along the shaft 78 and has a key engaged with a key way 81 in the shaft 78 for rotation with that shaft. The worm 72 lies between two brackets 83 extending downward from the carrier so that the worm is constrained to move with the carrier and thereby to remain in engagement with the gear 71 on the cam shaft. Consequently on rotation of the lead-screw 74 the cam 68 rotates while the carrier is moved. The two sleeves on each of the tubes on the carrier are spring-urged towards one another, e. g. by compression springs 84, so that the rollers 67 on the two sleeve-connecting members 66 are maintained in engagement with the cam 68. The cam 68 is of symmetrical elongated shape and is arranged so that, in accordance with the optical requirements, the lenses 13, 14 approach one another to a minimum separation and then move apart again to a maximum separation while they are both moved along the base-plate from one extreme position to the other. Backlash in the gearing is reduced to a minimum by accurate machining and if desired the idler wheel 82 may be urged into even closer engagement with the gears 76 by means of a strong spring.

The lead-screw shaft 77 carries a chain wheel 91 connected by a driving chain 92 to a chain wheel 93 on a shaft 94 which is journalled in brackets 95 on the base plate 55. The shaft 94 is movable axially in the brackets 95 and has a key-way 96 into which the chain wheel 93 is keyed, e. g. by grub-screws 98, for rotation with the shaft 94, being held against axial movement by the adjacent bracket 95 and a sleeve 97. The shaft 94 is provided with a control handle 101 by means of which it may be rotated or moved axially.

The cell 51 carrying the lens 11 is attached to a slide member 102 which is slidable along rods or tubes 103, extending between the end plates 53, 54, to move the lens 11 axially for focussing the system on to any particular object at a distance from infinity to about 13 feet 9 inches away from the system. The range of movement of the cell 51 is from the position shown in full lines to that shown in chain lines in Figure 2. The slide member 102 is connected by a pivoted link 103 to an arm 104 rigidly attached to one end of a shaft 105 journalled in blocks 106 rigidly mounted on the rods 103. The other end of the shaft 105 is rigidly secured to an arm 106 having a slot 107 sliding on a headed stud 108 provided on a sleeve 109 rigidly secured to the shaft 94. Axial movement of the shaft 94 as aforesaid, consequently produces corresponding axial focussing movement of the lens cell 51.

An iris diaphragm 111 is mounted on the carrier 57 so that when the lenses 13, 14 are in their extreme positions the diaphragm is very close to the optical surface 39 of the lens 14. The diaphragm housing 112 is rigidly mounted on the carrier 57 by members 113 so that when the lens 14 is moved by the cam 68 the lens 14 moves away from the diaphragm 111 through a short distance. The radially extending operating lever 114 of the diaphragm is connected by a short telescopic extension to a ball 115 which is trapped between opposed grooves formed in the side walls of a longitudinally extending straight slot 116 in an arm 117. The arm 117 is pivoted at 118 about a horizontal axis to a bracket 119 at the front end of the base-plate 55 and extends upwardly and rearwardly from the pivot 118, along the side of the lens system, and its upper end is provided with a guide channel 121 which embraces, and slides along, a quadrant guide plate 122 secured to the end plate 54. As the carrier moves along the base-plate the operating lever of the iris diaphragm is moved by the cam action of the slot in the arm, on the ball which co-operates with it. The iris diaphragm is thereby adjusted to maintain the optical system at a substantially constant relative aperture while the lenses 13 and 14 are moved. The arm 117 has a second slot 123 which receives a pin 124 on an arm 125 rigidly mounted on a shaft 126 pivoted in brackets 127, 128. The shaft 126 is provided with a control knob 131 whereby it may be rotated to cause the pin 124 to rotate arm 117 about its pivot 118, thereby to change the inclination of the arm 117 relative to the optical axis and consequently to change the value at which the relative aperture of the system is maintained substantially constant while the lenses 13 and 14 are moved to vary the magnification. The knob is provided with a spring ball detent 132 engaging with any one of a series of depressions in a plate 133, which depressions are marked with the values of relative aperture corresponding to engagement with the respective depressions.

The invention is not restricted to the details of the foregoing example. For instance the mechanical arrangement for moving the movable lenses may be modified so that one movable lens is rigidly attached to the carrier and so that the cam imparts the whole of the required relative movement between the movable lenses to the other movable lens. Separate cams may be provided for the two movable lenses respectively. Alternatively the mechanical arrangement for moving the movable lenses may be substantially as described in British specification No. 639,612. The iris diaphragm may alternatively be arranged to move axially with the movable lens 14 relatively to the carrier.

The mechanical adjusting arrangement for the lens 11 may alternatively comprise two diametrically opposite radially extending pins extending from an inner cell which rigidly carries the lens 11. In this alternative arrangement each pin is surrounded by a feather and passes firstly through a straight slot in a non-rotatable tube in which the inner cell slides, and then through a helically extending slot in an outer rotatable tube. The rotatable tube has a wire passing around it and secured to it at one position. The ends of the wire are taken by suitably placed pulleys to the opposite ends of a centrally pivoted bar so that partial rotation of the bar pulls one end of the wire and pushes the other so as to produce corresponding rotation of the outer rotatable tube and hence axial movement of the lens 11. The pivoted bar has one end secured by a universal joint to a control shaft arranged for axial movement to produce rotation of the bar.

In the foregoing example the variable magnification telescopic system consisting of lenses 11, 12, 13 and 14 is entirely symmetrical. On varying the magnification, the aberrations of the system remaining constant, and since lens 12 does not move during this operation, its aberrations also remain constant. It follows, therefore, that the aberrations of lenses 11, 13 and 14 taken together remain constant when the magnification is changed. Thus, lens 12 may be of any desired form which will provide the necessary or desired combination of final aberration and focal position. In the general case it does not need to be the same as lens 11.

I claim:

1. A variable magnification optical system comprising two normally stationary lenses, having powers of like sign, and two movable lenses, having powers of like sign which is opposite to the sign of the normally stationary lenses, all of which lenses are arranged on a common optical axis with the movable lenses between and spaced from the two normally stationary lenses and movable over a limited range between them, and magnification-varying mechanical adjusting means operable to effect simultaneously movements of the two movable lenses, relative to the normally stationary lenses and relative to each other, in the axial direction and according to a law such that the distance, from the normally stationary lenses, at which the image of an object at a fixed distance from the normally stationary lenses is accurately focussed by the system remains constant while the size of the said image is continuously varied during the operation of the magnification-varying means, in which system the movable lenses are compound, are optically identical at least in respect of the radii of their optical surfaces, their glasses and the thicknesses of their components, are arranged with their refracting surfaces symmetrically positioned about a point on the axis midway between the movable lenses and are substantially corrected for coma and spherical aberration at one limit of the range of movement of the movable lenses, whereby the change in coma and of spherical aberration of each movable lens during variation of the magnification is substantially compensated continuously by a change of coma and spherical aberration of the same magnitude, but of opposite sign, in the other movable lens.

2. A variable magnification optical system as claimed in claim 1, in which the two normally stationary lenses are positive lenses and the two movable lenses are negative lenses.

3. A variable magnification optical system as claimed in claim 1, in which the movable lenses are of meniscus form and each comprise at least one positive component lens and at least one negative component lens, the said positive component of each movable lens being the nearest component of that lens to the other movable lens, and in which system the normally stationary lens which is arranged to be nearer to the object when the system is in use is a compound lens of the so-called "flint-leading" construction.

4. A variable magnification optical system comprising two normally stationary lenses, having powers of like sign, and two movable lenses, having powers of like sign which is opposite to the sign of the normally stationary lenses, all of which lenses are arranged on a common optical axis with the movable lenses between and spaced from the two normally stationary lenses and movable over a limited range between them, and magnification-varying mechanical adjusting means operable to effect simultaneously movements of the two movable lenses, relative to the normally stationary lenses and relative to each other, in the axial direction and according to a law such that the distance, from the normally stationary lenses, at which the image of an object at a fixed distance from the normally stationary lenses is accurately focussed by the system remains constant while the size of the said image is continuously varied during the operation of the magnification-varying means, in which system the movable lenses are compound, are optically identical at least in respect of the radii of their optical surfaces, their glasses and the thicknesses of their components, are arranged with their refracting surfaces symmetrically positioned about a point on the axis midway between the movable lenses and are substantially corrected for coma and spherical aberration at one limit of the range of movement of the movable lenses, whereby the change in coma and of spherical aberration of each movable lens during variation of the magnification is substantially compensated continuously by a change of coma and spherical aberration of the same magnitude, but of opposite sign, in the other movable lens, and in which system the individual lenses are constructed to correct the system as a whole for astigmatism, field curvature, axial chromatic aberration and chromatic variation of magnification at one limiting position in the range of movement of the movable lenses, whereby the system as a whole is substantially corrected for these aberrations over the whole range of magnification.

5. A variable magnification optical system comprising two normally stationary lenses, having powers of like sign, and two movable lenses, having powers of like sign which is opposite to the sign of the normally stationary lenses, all of which lenses are arranged on a common optical axis with the movable lenses between and spaced from the two normally stationary lenses and movable over a limited range between them, and magnification-varying mechanical adjusting means operable to effect simultaneously movements of the two movable lenses, relative to the normally stationary lenses and relative to each other, in the axial direction and according to a law such that the distance, from the normally stationary lenses, at which the image of an object at a fixed distance from the normally stationary lenses is accurately focussed by the system remains constant while the size of the said image is continuously varied during the operation of the magnification-varying means, in which system each of the aforementioned four lenses is a compound lens individually corrected for chromatic aberrations, and the movable lenses are optically identical at least in respect of the radii of their optical surfaces, their glasses and the thickness of their components, are arranged with their refracting surfaces symmetrically positioned about a point on the axis midway between the movable lenses and are substantially corrected for coma and spherical aberration at one limit of the range of the limited movement of the movable lenses.

6. A variable magnification optical system as claimed in claim 5, in which each of the said movable lenses is a negative achromatic doublet of meniscus form, the movable lenses being arranged with their concave exterior faces towards one another and with their components of higher refractive index nearest to one another, and in which each of the said normally stationary lenses is a positive achromatic doublet arranged with its component of higher refractive index farthest away from the other normally stationary lens.

7. A variable magnification optical system as claimed in claim 6, comprising an additional normally stationary achromatic doublet lens coaxial with the aforementioned four lenses and positioned between said four lenses and the image position.

8. A variable magnification optical system as claimed in claim 5, in which the movable lenses have ranges of movement such that the joint magnification of the two movable lenses is variable from a maximum numerical value of $\sqrt{R}$ to a minimum numerical value of $$\frac{1}{\sqrt{R}}$$

where R is the ratio of the maximum value to the minimum value of the magnification of the system as a whole.

HAROLD HORACE HOPKINS.

References Cited in the file of this patent

UNITED STATES PATENTS

| Number | Name | Date |
|---|---|---|
| 1,790,232 | Flors | Jan. 27, 1931 |
| 1,947,669 | Warmisham | Feb. 20, 1934 |
| 2,159,394 | Mellor et al. | May 23, 1939 |
| 2,165,341 | Capstaff et al. | July 11, 1939 |
| 2,235,364 | Cramatzki | Mar. 18, 1941 |
| 2,353,565 | Kaprelian | July 11, 1944 |
| 2,454,686 | Back | Nov. 23, 1948 |
| 2,501,219 | Hopkins et al. | Mar. 21, 1950 |
| 2,514,239 | Hopkins | July 4, 1950 |